United States Patent [19]

Nozawa

[11] 4,330,998
[45] May 25, 1982

[54] LIQUEFIED NATURAL GAS-FREON ELECTRICITY GENERATION SYSTEM

[76] Inventor: Reikichi Nozawa, 2-10-38 Ohokayama, Meguroku, Tokyo, Japan

[21] Appl. No.: 973,735

[22] Filed: Dec. 28, 1978

[30] Foreign Application Priority Data

Dec. 29, 1977 [JP] Japan .................................. 52/159500

[51] Int. Cl.³ .............................................. F01K 23/04
[52] U.S. Cl. ....................................... 60/655; 60/651; 60/653
[58] Field of Search ................. 60/648, 651, 655, 671, 60/653, 679

[56] References Cited

U.S. PATENT DOCUMENTS

| | | | |
|---|---|---|---|
| 1,780,226 | 11/1930 | Elsner | 60/679 |
| 3,218,802 | 11/1965 | Sawle | 60/655 X |
| 3,376,706 | 4/1968 | Angelino | 60/651 X |
| 3,516,249 | 6/1970 | Paxton | 60/653 X |
| 3,878,683 | 4/1975 | Imai | 60/651 X |
| 3,892,103 | 7/1975 | Antonelli | 60/648 X |
| 3,977,196 | 8/1976 | Sedille | 60/655 |
| 4,033,135 | 7/1977 | Mandrin | 60/648 |

*Primary Examiner*—Allen M. Ostrager
*Assistant Examiner*—Stephen F. Husar

[57] ABSTRACT

The present invention relates to an electricity generation system, using freon as an agent to circulate between a warm heat source and a cold heat sink, recapturing electrical energy on one side and alleviating thermal pollution in the environment on the other side.

24 Claims, 3 Drawing Figures

LIQUEFIED NATURAL GAS-FREON ELECTRICITY GENERATION SYSTEM

BACKGROUND OF PRIOR ART

The present invention relates to an LNG-freon generation system, where LNG means "liquefied natural gas". To be more precise, the present invention concerns a novel generation system that uses freon as a working fluid, which is subjected to cooling by LNG directly or indirectly, pressurized by compressors, vaporized by heating, and which expands to drive a turbine and generates electricity.

The invention aims at moderating the heat pollution caused by the exhaust heat of a conventional steam power plant and the cold pollution caused by the exhaust cold of a vaporizing plant of LNG. To make clear the contribution this invention has on the energy problem, particularly the heat pollution problem on rivers and in seas, the motivation and background of the invention is described in the following.

In industrialized countries, nuclear and conventional steam power plants are located at their coastal areas or along rivers to ensure cooling water supply and to facilitate the disposal of huge amount of warm exhaust, which sometimes causes serious changes in ecology and produces a variety of reasons for opposition movements by citizens.

According to the present technology, a PWR or BWR nuclear power plant has a heat efficiency of 30% to 33%. Nearly 40% of its generated heat is carried into the sea or rivers by warm water through the condenser. For a 1000 MWe BWR power plant, the warm exhaust amounts of 70 tons per second, its temperature being kept 8° C. higher than that of the environment. In Japan for example, an estimate indicates that the discharged warm water from conventional and nuclear power plants in the whole of Japan will reach the amount of 600 billion tons per year toward the end of this century. This huge amount is comparable with the annual rainfall in Japan. Her coastal water will be affected immeasureably. Thus, it is an important issue in any industrial country to moderate the huge heat pollution coming from steam power plants.

Now in most industrial countries, the government faces more or less strong opposition from the public in developing its nuclear power programs. Some countries increase the importation of LNG year by year to compensate for the delay in its nuclear power programs. An example can be seen in Japan, which imported 5 million tons of LNG in 1975 and has a plan to import 30 to 42 million tons of LNG in 1985. The latter (42 million) is in the demand-supply plan drafted by the Energy Investigation Board of the Ministry of International Trade and Industry in December 1975 and the former figure (30 million) is the figure in the revised plan drafted by the same Board in December 1977.

The temperature of LNG is as low as $-162°$ C. under 1 atmosphere, therefore, it has to be vaporized and heated to room temperature before coming into use. More than 200 Kcal is required to obtain 1 Kg of natural gas at room temperature by heating LNG. The gasification of LNG is usually accomplished by heat exchange with sea water. This gasification of LNG discharges 25 thousand tons of cold sea water 8° C. below the environmental temperature in order to have one thousand tons of natural gas at room temperature. Judging from this point, it is obvious that an enormous amount of cold sea water poured into a closed sea, such as Tokyo Bay and Osaka Bay, will cause a serious cold water pollution problem sooner or later.

Stimulated by these pollution problems, the present invention has been conceived to bridge the heat pollution and the cold pollution by circulating a freon as a working fluid. Any difference in temperature should produce some electricity. A typical example is a thermo-couple.

BRIEF SUMMARY OF THE INVENTION

The main object of the present invention is to use freon to absorb heat discharged from a condenser of a steam power plant, to convert a part of the absorbed heat into mechanical energy driving a turbine to generate electricity, and to discharge the other part of the absorbed heat to LNG. In simple language, it is an LNG-freon power generation system that absorbs heat from a steam power plant as a heat source, discharges heat to LNG as a heat sink, and drives a turbine in the process of expansion of the freon. The other objects and advantages are made apparent in the following detailed description with reference to the accompanying drawings.

DETAILED DESCRIPTION OF THE INVENTION

"Freon", named commercially by the Dupont Chemical Company, is mentioned in the present text to mean collectively the fluorine and chlorine or bromine substituted hydrocarbon compounds. It serves as a working fluid of a power generation system because of the following characteristics:
1. nonflammable and nonexplosive,
2. chemically stable, and noncorrosive on metallic components of the power generation system,
3. not very harmful in the case of leakage due to mechanical failure,
4. has quite low vapor pressure at $-162°$ C. (boiling point of LNG).

It is recommended in practice to choose a freon or its mixture which possesses further the following characteristics:
5. inexpensive,
6. has its freezing point in the proximity of $-162°$ C., and has its critical point not far from the temperature of the environment.

In the following, freon R13B1 (chemical formula $CF_3Br$) is chosen as a working fluid. Based on the general ideas as expounded in FIG. 1 and in FIG. 2 (Mollier diagram for R13B1), the present invention is explained theoretically in three kinds of cycle.

Some of the thermodynamic characteristics of freon R13B1 are summarized as follows:

| | |
|---|---|
| Molecular weight | 148.9 |
| Freezing point | $-168°$ C. |
| Boiling point under the vapor | |

-continued

| | |
|---|---|
| pressure 4.3 mB | −130° C. |
| Boiling point (under 1 atmosphere) | −58° C. |
| Vaporization heat at boiling point | 28.6 Kcal/Kg |
| Critical temperature | 67° C. |
| Critical pressure | 39 Kg/cm |

Figure 2:
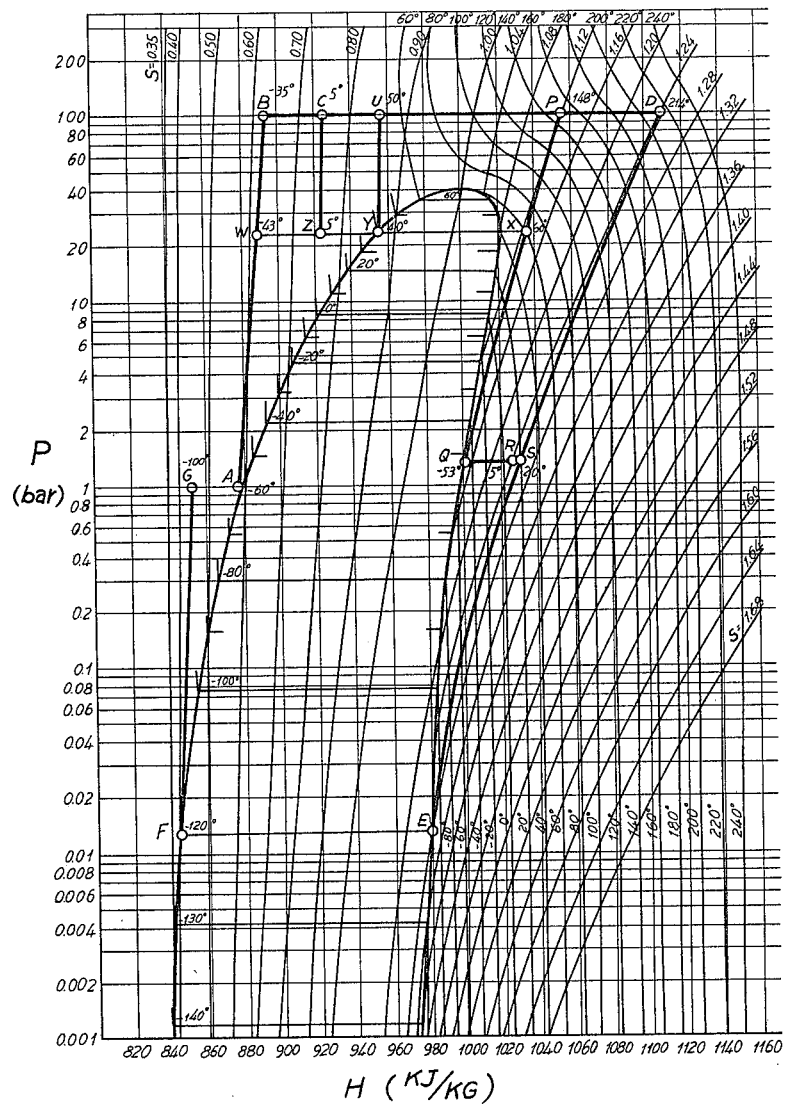
FIG. 2 is a drawing that illustrates the states of freon R13B1 mentioned in the description.

FIG. 2 is the Mollier diagram (logarithmic pressure versus enthalpy diagram) of freon R13B1. In FIG. 2, A, B, C, . . . P, Q etc. indicate the thermodynamical states of R13B1.

The First Cycle

| State | Pressure (Bar) | Temperature (°C.) | H (KJ/Kg) |
|---|---|---|---|
| A | 1 | −60 | 877 |
| B | 100 | −35 | 893 |
| C | 100 | 5 | 923 |
| D | 100 | 14 | 1,108 |
| E(saturated vapor) | 0.013 | −120 | 980 |
| F(saturated liquid) | 0.013 | −120 | 846 |
| G | 1 | −100 | 848 |

State A is maintained in the interior of the storage tank of freon R13B1. The numerical values of enthalpy are so adjusted to give 1,000 KJ/Kg, at the critical point (40 Bars, 67° C.). The first cycle is a kind of Rankine cycle where the loss is taken into account by introducing an increase in entropy, which can be taken as 0.04 KJ/KG° C. by experience in each of compression processes A→B, F→G and expansion process D→E.

The first cycle is made up of the following 7 processes:
 A→B: pressurized by the compressor,
 B→C: heated by the condenser of a steam power plant,
 C→D: heated by the boiler,
 D→E: expansion in driving the turbine,
 E→F: liquefaction caused by the condenser,
 F→G: pressurized by the pump,
 G→A: heated by the condenser of a steam power plant.

In this cycle, freon R13B1 in state B and state G works as a cooling agent delivered to a condenser of a steam power plant in place of cooling water. This condenser is to cool the working steam of the steam power plant to 8° C. (corresponding to saturated vapor pressure of 8 mm Hg) and to heat R13B1 up to state C and state A. Thus, the exhaust heat from the condenser of the steam power plant can be completely absorbed by the freon and the problem of heat pollution can be moderated.

The exit of the turbine is connected directly to a condenser which realizes the liquefaction process, E→F, by using LNG (1 atmosphere, −162° C.) as a cooling agent. LNG is vaporized to be natural gas and is heated to the temperature −130° C. after passing through the condenser. This eliminates the cold pollution by 63%, which is brought about by the temperature normalization of LNG. The remaining 37% of the cold latent heat of LNG is partly utilized to maintain the freon at −60° C. in the storage tank.

In the first cycle, using KJ/Kg as unit, the energy balance is as follows:

| | |
|---|---|
| Heat coming from a steam power plant; | 59 |
| wherein B → C: 30 | |
| G → A: 29 | |
| Heat supplied by the boiler (C − D): | 185 |
| Input energy delivered by compressors: | 18 |
| wherein A → B: 16 | |
| F → G: 2 | |
| Mechanical energy generated by the turbine: | 128 |
| Heat discharged to the condenser: | 134 |

The ratio of the mechanical energy generated to the total input energy is a sort of efficiency of the system. The efficiency, in this sense, of the first cycle is $128/(59+185+18)=48\%$.

But the heat energy 59 KJ/Kg discharged from a steam power plant can be termed unpaid receipt. Economically therefore, it is well to consider the "paid efficiency" defined by mechanical energy generated Paid efficiency = paid input energy which, for the first cycle, has the value $$128/(185+18)=63\%$$

The first cycle has the following advantages:
1. High paid efficiency (up to 63%);
2. Capable of moderating the heat pollution caused by a steam power plant and the cold pollution caused by an LNG-gasification plant;
3. Capable of raising the thermal efficiency of a steam power plant.

The last advantage 3 is based on the following fact: The conventional steam power plant uses river or sea water as cooling agent for its condenser. This limits the vapor pressure in the condenser in the range 26 mm Hg (corresponding to the boiling point 27° C.) to 38 mm Hg (corresponding to the boiling point 33° C.). If sufficient freon R13B1 at 5° C. is used as a cooling agent, then the vapor pressure in the condenser can be maintained at as a low pressure as 8 mm Hg (corresponding to the boiling point 8° C.) and the thermal efficiency of a steam power plant, usually 33% for example, may be improved by 3% to attain a heat efficiency of 36%.

The Second Cycle

This is a reheating cycle that employs the following 4 states to replace state D of the first cycle.

| State | Pressure (Bar) | Temperature (°C.) | H (KJ/Kg) |
|---|---|---|---|
| P | 100 | 148 | 1,055 |
| Q(saturated vapor) | 1.4 | −53 | 1,000 |
| R | 1.4 | 5 | 1,025 |
| S | 1.4 | 20 | 1,032 |

The second cycle is made up of the following 10 processes:
 A→B: pressurized by the compressor,
 B→C: heated by the condenser of a steam power plant,
 C→P: heated by the boiler,
 P→Q: expansion in the high pressure turbine,
 Q→R: heated by the condenser of a steam power plant,
 R→S: reheated by the boiler, S→E: expansion in the low pressure turbine,
E→F: liquefied by the condenser,
F→G: pressurized by the pump,
G→A: heated by the condenser of a steam power plant.

Figure 1:
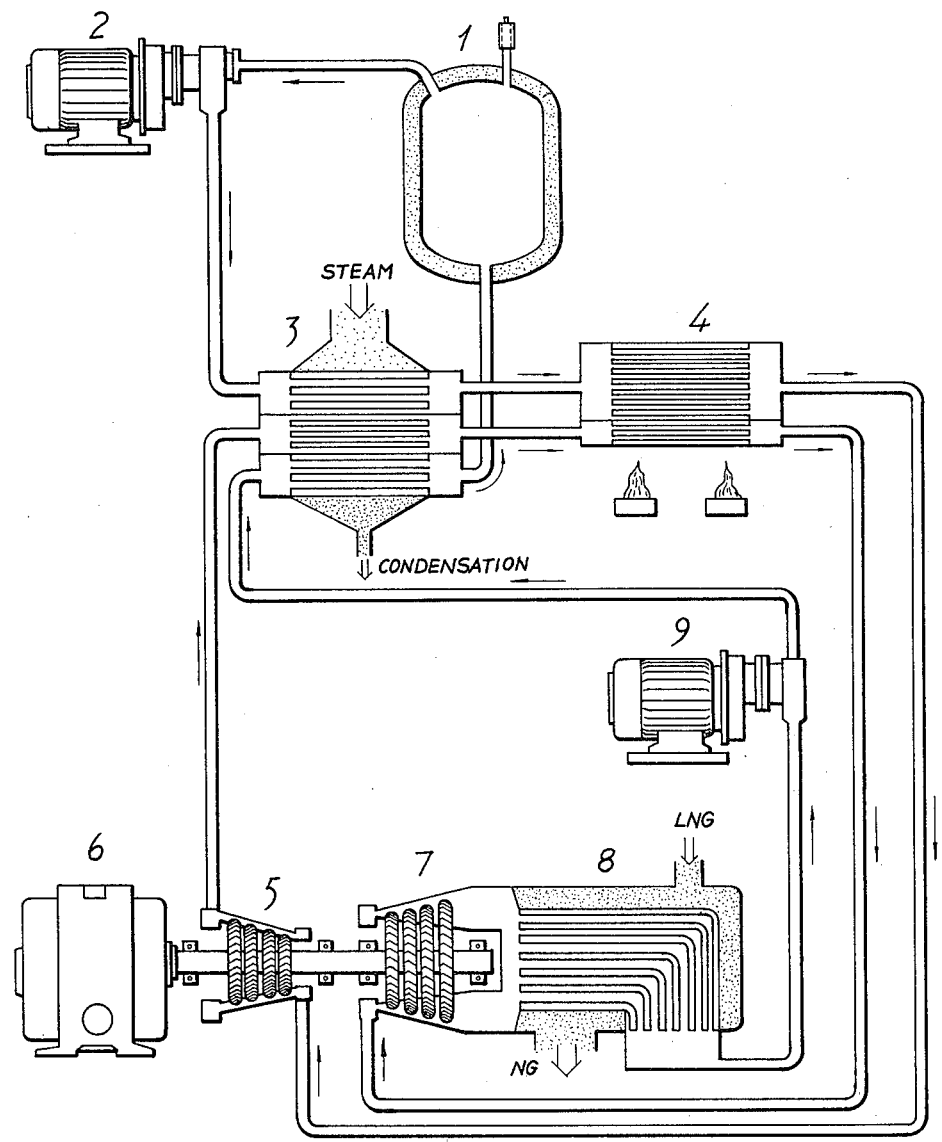
FIG. 1 is a drawing that illustrates the ideas in an embodiment of the present invention, i.e., a liquefied natural gas-freon power generation system.

According to the illustration of FIG. 1, 1 is the tank that contains freon at state (1 Bar, −60° C.); the freon taken from the tank is pressurized by the compressor 2 to a state (100 Bar, −35° C.), then input to a condenser 3 of a steam power plant; the freon absorbs heat discharged from the steam power plant or the nuclear power plant using steam turbine through its condenser and is heated to state (100 Bar, 5° C.) before being input to the boiler 4. The freon is heated by the boiler to a state (100 Bar, 148° C.) and led to the high pressure turbine 5, which generates electricity by means of a generator 6. After passing through the high pressure turbine, the freon expands to a state (1.4 Bar, −53° C.), then it is led into the condenser of the steam power plant 3 and heated to a state (1.4 Bar, 5° C.). Thereafter, it is heated by the boiler to (1.4 Bar, 20° C.). Flowing out from the boiler, the freon is led into the low pressure turbine 7 and generates electricity by means of generator 6. After passing through the low pressure turbine, the freon is led into the condenser 8 and condenses to a state (0.013 Bar, −120° C., liquid) by means of LNG (−162° C.). Subsequently, it is pressurized to a state (1 Bar, −100° C.) by the pump 9. The (1 Bar, −100° C.) freon is led again into the condenser of the steam power plant and heated to state (1 Bar, −60° C.) and returned to the storage tank 1. Note that the condenser 8 is connected directly to the exit of the low pressure turbine.

In the expansion processes P→Q and S→Q, the increase in entropy, from experience, can be taken as 0.02 KJ/Kg° C. The saturated state Q at the exit of the high pressure turbine can be attained by maintaining the freon R13B1 at temperature −53° C. For this maintenance, the freon in the storage tank (state A: −60° C., 1 Bar) can be used as a cooling agent for a heat exchanger connected directly to the exit of the high pressure turbine.

The heat balance of the second cycle, using KJ/Kg as unit, is given as follows:

| | |
|---|---|
| Energy input due to compression (A → B, F → G): | 18 |
| Heat supplied by a steam power plant (B → C, Q → R, G → A): | 84 |
| Heat supplied by the boiler (C → P, R → S): | 139 |
| Energy generated by the turbine (P → Q, S → E): | 107 |
| Heat discharged to the condenser (E → F): | 134 |

Thus, the paid efficiency for the second cycle is given by *generated mechanical energy* paid input energy = 107/(18+139) = 68%.

The improvements of the second cycle over the first cycle are:
1. Paid efficiency is raised from 63% to 68%;
2. Maximum temperature of the freon in the cycle is lowered from 214° C. to 148° C. Although freons are in general chemically stable compounds, some of them have a tendency to dissolve very slowly in the temperature range of 105° C. to 150° C., especially in the presence of oil, water, iron and copper. Therefore, for the safe, stable and lasting running of the circulating system, it is very important to employ a reheating cycle to lower the maximum temperature of the working freon.

The Third Cycle

Figure 3:
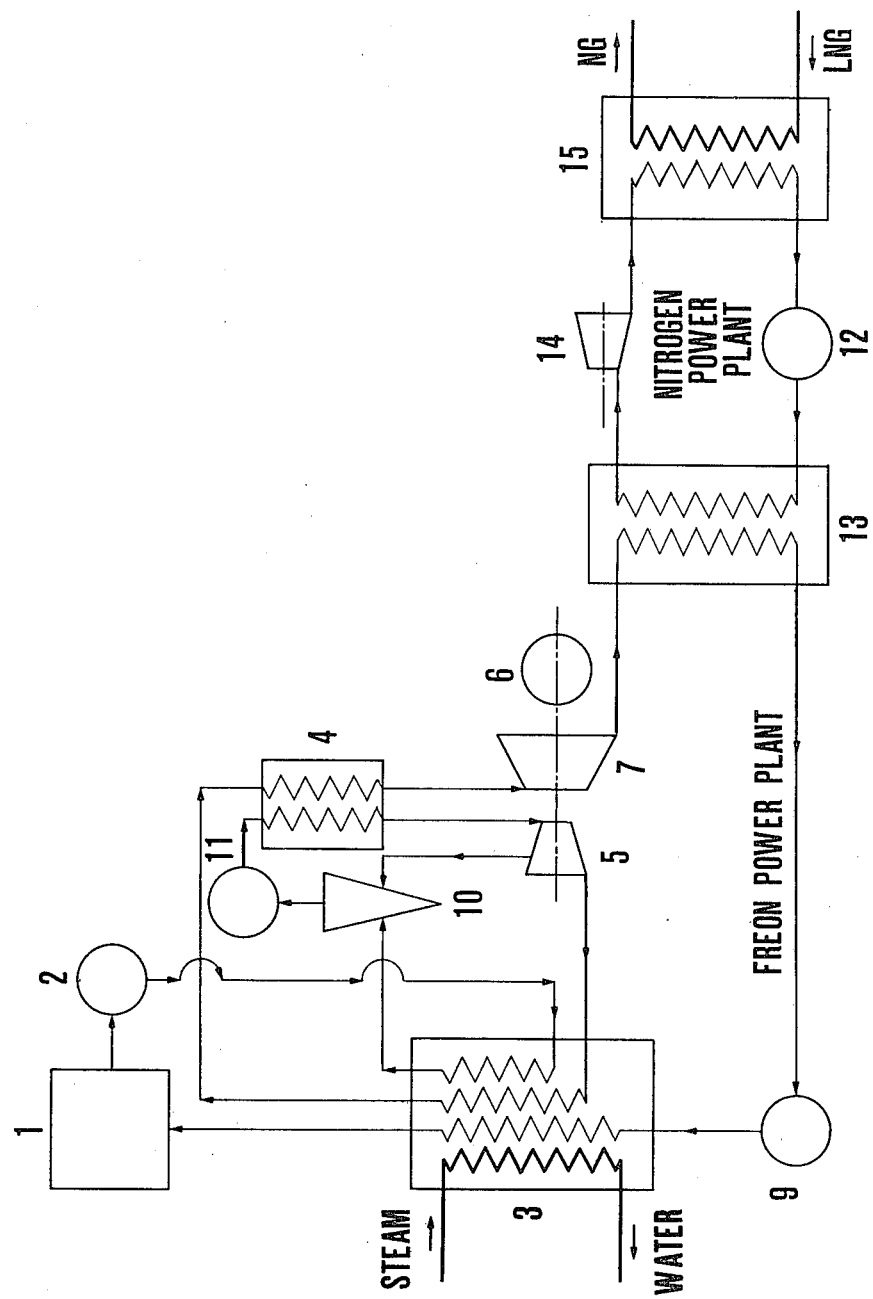
FIG. 3 illustrates another embodiment of the present invention.

This is a reheating and regenerating cycle, wherein a part of the freon is extracted from a mid-stage (state X) of the high pressure turbine 5 and is mixed in mixing device 10 with the cold freon (state Z) taken out from the storage tank (state A), after first passing through condenser 3, to produce a saturated liquid (state Y). A regeneration process makes the Rankine cycle approximate more closely a Carnot cycle and improves its heat efficiency. An apparatus making use of this cycle is shown in FIG. 3. As can be seen, FIG. 3 also shows a nitrogen power plant between the freon power plant and the LNG. The use of a nitrogen power plant is an alternative embodiment which is described in detail in the section of this patent entitled "LNG-FREON-NITROGEN POWER GENERATION SYSTEM".

An example is explained here, where, X, Y, Z, and W are chosen on the isobar line of 23 bar which is the saturated vapor pressure at 40° C.:

| State | Pressure (Bar) | Temperature (°C.) | H (KJ/Kg) |
|---|---|---|---|
| X | 23 | 60 | 1,035 |
| Y (saturated liquid) | 23 | 40 | 953 |
| Z | 23 | 5 | 924 |
| W | 23 | −43 | 888 |
| U | 100 | 50 | 955 |

The present regeneration proceeds with the heating of direct mixing type by extracted vapor. The third cycle is composed of the following 13 processes:

A→W: Freon from storage tank 1 is pressurized by the compressor 2,
W→Z: heated by the condenser 3 of a steam power plant,
Z→Y: heated by direct mixing, in mixing device 10 with extracted vapor,
Y→U: pressurized by a pump 11,
U→P: heated by the boiler 4,
P→Q: expansion in the high pressure turbine 5,
Q→R: reheated by the condenser 3 of a steam power plant,
R→S: reheated by the boiler 4,
S→E: expansion in the low pressure turbine 7.
E→F: liquefied by the condenser, (e.g., condenser 8 of FIG. 1 or condenser 13 of FIG. 3),
F→G: pressurized by the pump 9,
G→A: heated by the condenser 3 of the steam power plant,
X→Y: cooled by the mixing of liquid freon (state Z), with a% of the vapor freon extracted from a mid-stage (state X) in the high pressure turbine 5.

The entropy increase in the pressurizing process A→W is estimated to be 0.04 KJ/Kg° C. and the entropy increase in the pressurizing process Y→U is estimated to be 0.01 KJ/Kg° C. Liquid freon in state Z and extracted freon vapor in state X are mixed together in an extracted-gas heating device 10. Since the requirement for mixing in the extracted gas-heating device is given by $$a(1{,}035 - 953) = (100 - a)(953 - 924),$$

we have $a = 26\%$; $100 - a = 74\%$

The heat balance in the third cycle, using KJ/Kg as unit, is as follows:

| | | |
|---|---|---|
| Heat obtained from the condenser of a steam power plant: | | 67 |
| wherein W → Z: | 0.74 (924 − 888) = 27 | |
| Q → R: | 0.74 (1,025 − 1,000) = 18.5 | |
| G → A: | 0.74 (877 − 848) = 21.5 | |
| Heat supplied by the boiler: | | 105 |
| wherein U → P: | 1,055 − 955 = 100 | |
| R → S: | 0.74 (1,032 − 1,025) = 5 | |
| Heat discharged through the condenser: | | 99 |
| E → F: | 0.74 (980 − 846) = 99 | |
| Energy generated by the turbine: | | 84.5 |
| wherein P → X: | 1,055 − 1,035 = 20 | |
| X → Q: | (1,035 − 1,000) = 26 | |
| S → E: | 0.74 (1,032 − 980) = 38.5 | |
| Energy input by compressors: | | 11.5 |
| wherein A → W: | 0.74 (888 − 877) = 8 | |
| Y → U: | 955 − 953 = 2 | |
| F → G: | 0.74 (848 − 846) = 1.5 | |

The paid efficiency for the third cycle (a reheating and regenerating cycle) is $$84.5/(105 + 11.5) = 72\%$$

In the first cycle through the third cycle described above, the working fluid R13B1 is kept at $-120°$ C. (corresponding to the saturated vapor pressure 13 mB) in condenser 8. This is because with the present stage of technology, it is very expensive to manufacture a large condenser for maintaining a vacuum below 10 mB; of course, it may be possible to make the described LNG-freon power generation system even more efficient by lowering the condenser temperature below $-120°$ C. in the future with more advanced technology. For reference's sake, some numerical figures on the liquid phase line in the R13B1 Mollier diagram (log P→H diagram) are listed below:

| Temperature (°C.) | Saturated vapor pressure (Bar) | H (KJ/Kg) |
|---|---|---|
| −100 | 0.078 | 853 |
| −120 | 0.0129 | 847 |
| −130 | 0.0043 | 842 |
| −140 | 0.0012 | 839 |

LNG-freon-nitrogen power generation system

The paid efficiency 72% for the third cycle can further be improved to 78% by combining with it an LNG-nitrogen generation system.

In such a duplex power generation system, LNG as a cooling agent of the condenser 8 of the LNG-freon power generation system is replaced by cold nitrogen and a part of the heat absorbed by the nitrogen is converted into mechanical energy by a turbine 14.

A thermodynamic cycle of nitrogen used to attain the above purpose is described below:

| State | Temperature (°C.) | Pressure (atm) | H (cal/mol) |
|---|---|---|---|
| K | −150 | 50 | 680 |
| L | −124 | 80 | 1,500 |
| M(saturated vapor) | −158 | 20 | 1,370 |
| N(saturated liquid) | −138 | 20 | 600 |

K and L are states of nitrogen at the entrance and the exit of a freon-condenser 13 respectively. The nitrogen gas in state L expands and begins to liquefy in state M at the entrance of a nitrogen-condenser 15 (a condenser which condenses nitrogen) which is cooled by LNG ($-162°$ C.) At the exit of the nitrogencondenser 15, nitrogen stays in state N. It is pressurized by a pump 12 to state K and is delivered to the freon-condenser 13 which heats up the nitrogen into state L, thus making up a closed cycle for nitrogen.

The heat balance in the above cycle of nitrogen, using cal/mol as unit, is as follows:

| | |
|---|---|
| Energy input from the compressor 12 (N → K): | 80 |
| Heat supplied by the freon-condenser 13 (K → L): | 820 |
| Energy generated by the nitrogen-driven turbine 14 (L → M): | 130 |
| Heat discharged to LNG (M → N): | 770 |
| Net energy generated: 130−80 = | 50 |

Thus, the heat efficiency of our nitrogen cycle is given by $$\text{Heat efficiency} = \frac{\text{net mechanical energy generated}}{\text{heat supplied to the system}} = \frac{50}{820} = 6\%$$

When this LNG-nitrogen power generation system is combined with the aforementioned third cycle (LNG-freon reheating and regenerating system) to form a duplex system, the new paid efficiency is energy generated by $$\frac{\text{the combined system}}{\text{paid energy input to the combined system}} = \frac{84.5 + (130 \times 99)/820}{105 + 11.5 + (80 \times 99)/820} = 79\%$$

The inventor of the present invention has filed a patent application related to the nitrogen power generation system on Mar. 30, 1977 and the application is published in the Official Gazette on Oct. 25, 1978 (Official Gazette patent, Office of Patent, Japan, Volume 53-122040).

Described above is a preferred embodiment of the present invention to realize an LNG-freon power generation system. Of course, other related systems containing a heat source and a heat sink can be developed into many different types of embodiments using the spirit and method of the present invention. This is obvious and apparent. For example, although the above presentation utilizes the discharged heat of a steam power plant, the system is not in any way limited by this embodiment. Other heat sources that possess the same effect, such as the discharged heat from steel mills or other factories, can all be used to replace that of a steam power plant. In like manner, the heat sink is not limited to LNG.

In summary, a main characteristic of the present invention is the use of freon as a working fluid; the utilization of the discharged heat of a steam power plant as heat source and LNG as heat sink is only a preferred embodiment of the present invention.

I claim:

1. A method of generating power utilizing a refrigerant as the working fluid and for limiting the temperature of the refrigerant below its decomposition range of temperature, the method including the steps of circulating the refrigerant in a closed circuit through a storage tank, a compressor, a heating means, a gas turbine, and a condensing means, characterized in that the refrigerant, after passing through a high-pressure gas turbine (5), is reheated and is then passed through a low-pressure gas turbine (7).

2. The method according to claim 1, wherein a regeneration process is superimposed in such a way that a part of the refrigerant is extracted from a midstage of the high-pressure turbine (5) and is mixed with the refrigerant heated by a heat exchanger (3) to produce a saturated liquid refrigerant in an extracted-gas heating device (10).

3. The method according to claim 1 or 2, characterized in that the working refrigerant has a freezing point below −82° C. and in that the means for condensing the refrigerant comprises a gasification plant (8) for gasifying liquid natural gas where the refrigerant flows in heat-exchange relationship with the liquid natural gas.

4. The method of generating power as claimed in claim 3 wherein the refrigerant is a Freon or a fluorinated hydrocarbon.

5. The method according to claim 2, characterized in that the means for heating the refrigerant comprises a heat exchanger (3) where the refrigerant is vaporized by flowing in heat-exchange relationship with steam from a cooling water system of an industrial plant.

6. The method according to claim 5, wherein the heat exchanger (3) is a steam-condenser of a steam power plant where the vapor pressure of steam leaving turbine of the steam power plant is maintained at a very low pressure.

7. The method according to claim 6, wherein the steam vapor pressure in the outlet of the steam-condensor of said steam power plant is maintained below 0.01 atmosphere.

8. The method according to claims 1 or 2, characterized in that the means for heating the refrigerant comprises a heat exchanger (3) where there refrigerant is vaporized by flowing in heat-exchange relationship with steam from a cooling water system of an industrial plant.

9. The method according to claim 8, wherein the heat exchanger (3) is a steam-condenser of a steam power plant where the vapor pressure of steam leaving turbine of the steam power plant is maintained at a very low pressure.

10. The method according to claim 9, wherein the steam vapor pressure in the outlet of the steam-condenser of said steam power plant is maintained below 0.01 atmosphere.

11. An apparatus for generating power, comprising a refrigerant and refrigerant storage means;
a refrigerant compressor coupled to said storage means for pressurizing said refrigerant;
refrigerant heating means for heating said refrigerant leaving said compressor;
a high pressure gas turbine driven by vaporized refrigerant from said heating means and producing output mechanical energy, the temperature of the refrigerant being limited below its decomposition range of temperature by said high pressure gas turbine;
reheating means for heating said refrigerant leaving said high pressure gas turbine;
a low pressure gas turbine driven by vaporized refrigerant from said reheating means and producing output mechanical energy;
a first heat exchanger functioning as a refrigerant condenser for refrigerant leaving said low pressure gas turbine;
a pump for receiving refrigerant condensate from said first heat exchanger, routing it back to said refrigerant storage means; and
a condensate heating means interposed between said pump and said storage means for heating and thereby vaporizing said refrigerant condensate.

12. The apparatus according to claim 11, wherein said means for reheating the refrigerant comprises a vaporization device (3) and a heating device (4).

13. The apparatus as claimed in claim 12, wherein the vaporization device (3) is connected to exhaust-steam outlet of a cooling water system of an industrial plant.

14. The apparatus according to claim 13, wherein said industrial plant is a steam power plant and wherein said vaporization device (3) comprises a steam-condenser of said steam power plant for maintaining a very low pressure in the steam leaving a steam turbine of said steam power plant.

15. The apparatus according to claim 14, wherein the steam vapor pressure in the outlet of the steam-condenser of said steam power plant is maintained below 0.01 atmosphere.

16. The apparatus as claimed in any one of claims 11, 12 to 15, comprising a regeneration means including means for extracting a part of the freon from a midstage of said high pressure turbine and mixing the extracted part with cold freon from said storage tank and routing the mixture through said heating means and back to the input of said high pressure turbine.

17. The apparatus as claimed in any one of claims 11, 12 to 15, wherein the working refrigerant has a freezing point below −82° C. and wherein said means for condensing the refrigerant is a gasification plant for gasifying liquid natural gas and is constructed such that the refrigerant flows in heat-exchange relationship with the liquid natural gas.

18. The apparatus as claimed in claim 17, wherein the refrigerant is a Freon or a fluorinated hydrocarbon.

19. The apparatus as claimed in any one of claims 11, 12 to 15, wherein said apparatus is a duplex apparatus and includes a second closed circuit containing a second refrigerant colder than the refrigerant working in the first apparatus, said second closed circuit comprising:
a second pump for pumping second refrigerant condensate through said first heat exchanger in heat exchange relationship with said first refrigerant, said first heat exchanger heating and thereby vaporizing said second refrigerant;
a third gas turbine driven by vaporized second refrigerant from said first heat exchanger and producing output mechanical energy; and
a second heat exchanger functioning as a second refrigerant condenser for second refrigerant leaving said third gas turbine, said second heat exchanger receiving liquefied natural gas as an input, heating said liquefied natural gas in heat exchange with said second refrigerant, and outputting natural gas.

20. The apparatus according to claim 19, wherein the refrigerant working in the first apparatus is a Freon or a fluorinated hydrocarbon.

21. The apparatus according to claim 19, wherein the second refrigerant is nitrogen, a Freon or a fluorinated hydrocarbon having its freezing point below $-82°$ C.

22. The apparatus of claim 16, wherein said apparatus is a duplex apparatus and includes a second closed circuit containing a second refrigerant colder than the refrigerant working in the first apparatus, said second closed circuit comprising:

a second pump for pumping second refrigerant condensate through said first heat exchanger in heat exchange relationship with said first refrigerant, said first heat exchanger heating and thereby vaporizing said second refrigerant;

a third gas turbine driven by vaporized second refrigerant from said first heat exchanger and producing output mechanical energy; and a second heat exchanger functioning as a second refrigerant condenser for second refrigerant leaving said third gas turbine, said second heat exchanger receiving liquefied natural gas as an input, heating said liquefied natural gas in heat exchange with said second refrigerant, and outputting natural gas.

23. The apparatus as claimed in claim 16, wherein the working refrigerant has a freezing point below $-82°$ C. and wherein said means for condensing the refrigerant is a gasification plant for gasifying liquid natural gas and is constructed such that the refrigerant flows in heatexchange relationship with the liquid natural gas.

24. The apparatus as claimed in claim 23, wherein the refrigerant is a Freon or a fluourinated hydrocarbon.

* * * * *

UNITED STATES PATENT AND TRADEMARK OFFICE
CERTIFICATE OF CORRECTION

PATENT NO. : 4,330,998

DATED : July 7, 1983

INVENTOR(S) : Reikichi Nozawa

It is certified that error appears in the above—identified patent and that said Letters Patent is hereby corrected as shown below:

Column 3, line 7, "cm" should be --$cm^2$--.
Column 3, line 21, "14" should be --214--.
Column 3, line 33, "KG" should be --Kg--.
Column 4, line 5, "C-D" should be --C→D--.
Column 4, line 19, delete "mechanical energy generated".
Column 4, line 20, change "= paid input energy" to
$$-- \frac{Mechanical\ energy\ generated}{paid\ input\ energy} --$$

Column 4, line 45, "heat" should be --thermal--.
Column 5, line 34, "S→Q" should be --S→E--.
Column 5, line 54 "energy" should be
    --$energy/paid\ input\ energy$ --
Column 5, line 55, delete "paid input energy".
Column 7, line 18, insert --0.74-- before "(1,035".
Column 7, line 41, "P→H" should be -- P-H --.
Column 7, line 67, "80" should be --50--.
Column 8, line 6, "138" should be --158--.
Column 8, line 29, "heat" should be --thermal--.
Column 8, line 32, "Heat" should be --Thermal--.

UNITED STATES PATENT AND TRADEMARK OFFICE
CERTIFICATE OF CORRECTION

PATENT NO. : 4,330,998

DATED : July 7, 1983

INVENTOR(S) : Reikichi Nozawa

It is certified that error appears in the above—identified patent and that said Letters Patent is hereby corrected as shown below:

Column 8, line 40, delete "energy gener-"
Column 8, line 41, delete "ated by".
Column 8, line 44, "the combined system" should be replaced by --energy generated by the combined system--.

Signed and Sealed this

Third Day of July 1984

[SEAL]

Attest:

*Attesting Officer*

GERALD J. MOSSINGHOFF

*Commissioner of Patents and Trademarks*